US012596907B2

(12) United States Patent
Jung et al.

(10) Patent No.: US 12,596,907 B2
(45) Date of Patent: Apr. 7, 2026

(54) NEURAL NETWORK OPERATION APPARATUS AND METHOD

(71) Applicants:SAMSUNG ELECTRONICS CO., LTD., Suwon-si (KR); Seoul National University R&DB Foundation, Seoul (KR)

(72) Inventors: Hanwoong Jung, Seoul (KR); Soonhoi Ha, Seoul (KR); Donghyun Kang, Seoul (KR); Duseok Kang, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 1262 days.

(21) Appl. No.: 17/378,867

(22) Filed: Jul. 19, 2021

(65) Prior Publication Data

US 2022/0284263 A1 Sep. 8, 2022

(30) Foreign Application Priority Data

Mar. 4, 2021 (KR) ......................... 10-2021-0028800

(51) Int. Cl.
*G06N 3/063* (2023.01)
*G06N 3/04* (2023.01)
*G06N 3/0464* (2023.01)

(52) U.S. Cl.
CPC ............. *G06N 3/04* (2013.01); *G06N 3/0464* (2023.01); *G06N 3/063* (2013.01)

(58) Field of Classification Search
CPC ........ G06N 3/04; G06N 3/0464; G06N 3/063; G06N 3/08
See application file for complete search history.

(56) References Cited

U.S. PATENT DOCUMENTS 10,241,837 B2 3/2019 Huang et al.
11,868,872 B1 * 1/2024 Minkin ................... G11C 11/54
(Continued)

FOREIGN PATENT DOCUMENTS

CN 109033030 A 12/2018
CN 111401511 A 7/2020
(Continued)

OTHER PUBLICATIONS

Korean Office Action issued on Feb. 23, 2023, in counterpart Korean Patent Application No. 10-2021-0028800 (2 pages in English, 5 pages in Korean).
(Continued)

*Primary Examiner* — Abdullah Al Kawsar
*Assistant Examiner* — Gary Mac
(74) *Attorney, Agent, or Firm* — NSIP Law

(57) ABSTRACT

A neural network operation apparatus and method is provided. The neural network operation apparatus includes a memory configured to store data for a neural network operation, and a processor configured to validate the data based on a determination that the neural network operation should be performed on the data, obtain a real memory address to perform the neural network operation based on a result of the validating and a virtual tensor address of the data, and perform the neural network operation based on the real memory address.

12 Claims, 10 Drawing Sheets

(56)                References Cited

U.S. PATENT DOCUMENTS

| | | | |
|---|---|---|---|
| 2019/0042094 A1 | 2/2019 | Nair et al. | |
| 2019/0340498 A1* | 11/2019 | Mills | G06F 17/15 |
| 2020/0026997 A1 | 1/2020 | Yang | |
| 2020/0082264 A1 | 3/2020 | Guo et al. | |
| 2021/0097375 A1* | 4/2021 | Huynh | G06F 7/523 |

FOREIGN PATENT DOCUMENTS

| | | |
|---|---|---|
| EP | 3 786 785 A1 | 3/2021 |
| KR | 10-2019-0106185 A | 9/2019 |

OTHER PUBLICATIONS

Yazdanbakhsh, Amir, et al. "Ganax: A Unified MIMD-SIMD Acceleration for Generative Adversarial Networks." 45th Annual International Symposium on Computer Architecture May 2018 (12 pages in English).

Chen, Fan, et al. "Zara: A Novel Zero-Free Dataflow Accelerator for Generative Adversarial Networks in 3d ReRam." Proceedings of the 56th Annual Design Automation Conference 2019 (6 Pages in English).

Yazdanbakhsh, Amir, et al. "Flexigan: An End-to-End Solution for FPGA Acceleration of Generative Adversarial Networks." 2018 IEEE 26th Annual International Symposium on Field-Programmable Custom Computing Machines (FCCM) 2018 (8 Pages in English).

Fan, Zichen, et al. "Red: A ReRam-Based Deconvolution Accelerator." Jul. 2019 Design, Automation & Test in Europe Conference & Exhibition (7 pages in English).

Xu, Dawen, et al. "FCN-engine: Accelerating Deconvolutional Layers in Classic CNN Processors." Proceedings of the International Conference on Computer-Aided Design. 2018.

Korean Office Action issued on Oct. 27, 2023, in counterpart Korean Patent Application No. 10-2021-0028800 (5 pages in English, 6 pages in Korean).

* cited by examiner

Input/Output

```
Function conv_kernel(x, y, n)
1: O_TYPE output = 0;
2: for (int kx = 0; kx < Kx; kx++){
3:    for (int ky = 0 ; ky < Ky ; ky++){
         /* Input Tensor Virtualization */
4:       bool valid = Validate(x+kx, y+ky);
5:       if (!valid) continue;
6:       I_TYPE *p_input = GetInputAddr(x+kx, y+ky);
7:      for (int cc = 0 ; cc < C; cc+= Tc){
8:        for (int c = cc; c < cc + Tc; c++){
9:           output += p_input[c] * filter[n][kx][ky][c]
10:} } } }
11:return output;
```

Input/Output

```
1: for (int nn = 0; nn < N; nn += Tn){
2:    int ox = 0;
3:    for (int x = 0 ; x < W ; x+= sx){
4:       int oy = 0;
5:       for (int y = 0 ; y < H; y+= sy){
          /* Output Tensor Virtualization */
6:        O_TYPE * p_output = GetOutputAddr(x, y, nn);
7:        for (int n = 0 ; n < Tn; n++){
8:           p_output[n] = ReLU(conv_kernel(x, y, nn+n))
9:       } oy++; } ox++;
10:} }
```

[K=3, Stride=2, Pad=1]

530

520

510

Convolution
[K=3, Stride=1, Pad=(1,0)]

Zero padding insertion with stride of 2

Physical memory 540

550

300 read(p,q)

read (p, 2q)

Operator

Real tensor

×

Else:
ineffective

Virtual input tensor

NEURAL NETWORK OPERATION APPARATUS AND METHOD

CROSS-REFERENCE TO RELATED APPLICATIONS

This application claims the benefit under 35 USC § 119(a) of Korean Patent Application No. 10-2021-0028800 filed on Mar. 4, 2021, in the Korean Intellectual Property Office, the entire disclosure of which is incorporated herein by reference for all purposes.

BACKGROUND

1. Field

The following description relates to a neural network operation apparatus and method.

2. Description of Related Art

A neural processing unit (NPU) or a neural processor is a processor that processes a neural network operation. Typical neural processors may not support operations to reconstruct data used in a generative adversarial network (GAN), a segmentation network, and similar networks.

Thus, the typical neural processors may use a scheme of transmitting data to a host and then receiving the data back after a data reconstruction operation.

This method, however, may reduce the utilization of multiply-accumulate (MAC) operation devices in the neural processors and thus, lower the total performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a neural network operation apparatus includes a memory, configured to store data for a neural network operation; and one or more processors configured to: validate the data based on a determination that the neural network operation should be performed on the data; obtain a real memory address to perform the neural network operation based on a result of the validating and a virtual tensor address of the data, and perform the neural network operation based on the real memory address.

The one or more processors may be further configured to validate the data based on the virtual tensor address and a stride of the neural network operation.

The one or more processors may be further configured to validate the data based on a modulo operation between the virtual tensor address and the stride.

The one or more processors may be further configured to obtain the real memory address based on one of the virtual tensor address, a stride of the neural network operation, and a kernel size of the neural network operation.

The one or more processors may be further configured to obtain the real memory address based on a value of a floor function of a value obtained by dividing the virtual tensor address by the stride or the kernel size.

The neural network operation may include one of an upsampling operation and a transposed convolution operation.

The data may include at least one of a feature map, a width of the feature map, a height of the feature map, a number of channels of the feature map, a size of a kernel of the neural network operation, and a stride of the neural network operation.

The apparatus may include an operator, configured to perform the neural network operation, wherein the one or more processors are further configured to perform the neural network operation by inputting data corresponding to the real memory address to the operator.

The operator may include at least one multiply accumulator (MAC) operator.

In a general aspect, a neural network operation apparatus includes a memory, configured to store data for a neural network operation; and one or more processors configured to: obtain a real memory address to store a result of the neural network operation based on a virtual tensor address of the data, perform the neural network operation by inputting input data for the neural network operation to an operator, and transmit an output of the operator to the real memory address.

The one or more processors may be further configured to obtain the real memory address based on the virtual tensor address, a channel index of the input data, a number of channels of the input data, and a parameter of the neural network operation.

The parameter of the neural network operation may be determined based on a ratio of a size of a channel included in the input data, and a size of a channel included in an output of the neural network operation.

The neural network operation may include a convolution operation and an activation operation.

The one or more processors may be further configured to obtain the real memory address based on a value of a floor function using the channel index, the parameter, and the number of channels.

The one or more processors may be further configured to obtain the real memory address based on a modulo operation between the parameter and a value of a floor function using the channel index and the number of channels.

The one or more processors may be further configured to obtain the real memory address based on a modulo operation between the channel index and the number of channels.

In a general aspect, a neural network operation method includes receiving data for a neural network operation; validating the data based on a determination that the neural network operation should be performed on the data; obtaining a real memory address to perform the neural network operation based on a result of the validating and a virtual tensor address of the data; and performing the neural network operation based on the real memory address.

The validating of the data may include validating the data based on the virtual tensor address and a stride of the neural network operation.

The obtaining of the real memory may include obtaining the real memory address based on one of the virtual tensor address, a stride of the neural network operation, and a kernel size of the neural network operation.

The performing of the neural network operation may include performing one of an upsampling operation and a transposed convolution operation based on the real memory address.

Other features and aspects will be apparent from the following detailed description, the drawings, and the claims.

Figure 1A:
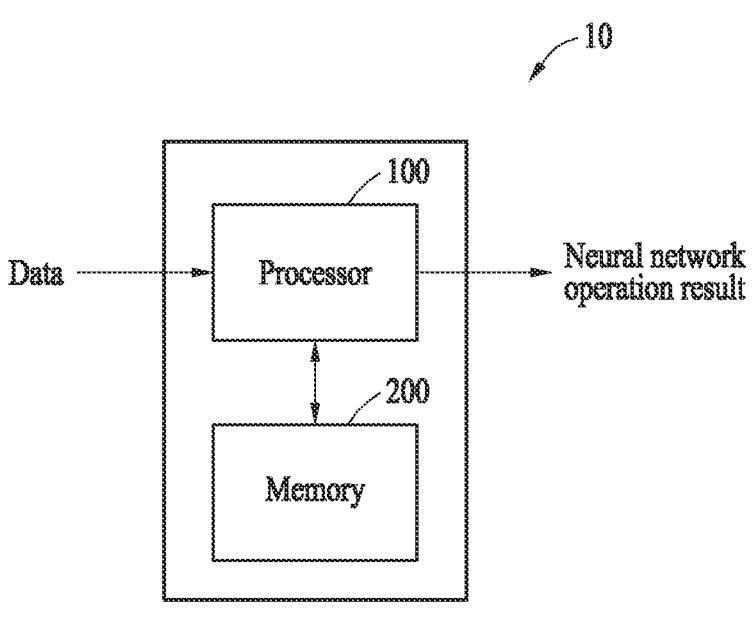
FIG. 1A illustrates an example neural network operation apparatus, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

Figure 1B:
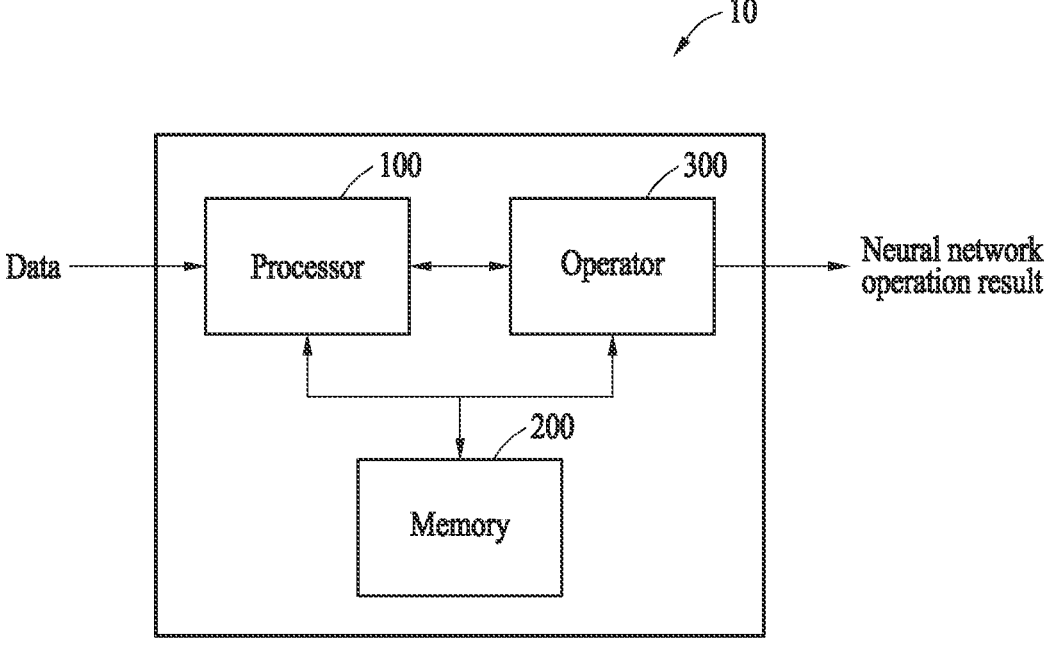
FIG. 1B illustrates an example neural network operation apparatus, in accordance with one or more embodiments.

FIGS. 1A and 1B illustrate examples of neural network operation apparatuses, in accordance with one or more embodiments.

Referring to FIGS. 1A and 1B, a neural network operation apparatus 10 may receive data, perform a neural network operation, and generate a neural network operation result.

A neural network is a processor-implemented computing system which is implemented by referring to a computational architecture. Technological automation of pattern recognition or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

The neural network may refer to a general model that has an ability to solve a problem. The training of a neural network may mean determining and updating weights and biases between layers or between a plurality of nodes (or neurons) forming the network. However, such reference to "neurons" is not intended to impart any relatedness with respect to how the neural network architecture computationally maps or thereby intuitively recognizes information, and how a human's neurons operate. In other words, the term "neuron" is merely a term of art referring to the hardware implemented nodes of a neural network, and will have a same meaning as a node of the neural network.

The nodes of the neural network may include a combination of weights or biases. The neural network may include one or more layers each including one or more nodes (or neurons). The neural network may infer a desired result from a predetermined input by changing the weights of the nodes through learning. For example, the weight and biases of a layer structure or between layers or neurons may be collectively referred to as connectivity of a neural network. Accordingly, the training of a neural network may denote establishing and training connectivity. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The neural network may include, as non-limiting examples, a deep neural network (DNN). The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The neural network operation apparatus 10 may perform a neural network operation. The neural network operation may include, as a non-limiting example, a data reconstruction operation. For example, the neural network operation may include an upsampling operation, a transposed convolution operation, or a subpixel convolution operation.

The neural network operation apparatus 10 may perform the data reconstruction operation based on data.

The data reconstruction operation refers to an operation that replicates the same value or changes the position of data within a tensor, without changing the value of data. The data reconstruction operation may include an upsampling operation (for example, nearest neighbor upsampling), a transposed convolution, or a subpixel convolution.

The tensor may refer to a generalized data structure of a matrix or vectors formed in a multi-dimensional array, or an object of multilinear algebra.

In the data reconstruction operation, the operation of replicating data may include an operation of reading the same data multiple times, and the operation of changing the position within the tensor may include an operation of changing an order to read data according to desired positions. The neural network operation apparatus 10 may perform the neural network operation by performing data reconstruction on data used for the neural network operation.

The neural network operation device 10 may perform the data reconstruction operation therein, rather than bringing the data back from a separate host after the data are processed. The neural network operation device 10 may perform the data reconstruction operation by fetching the data to a suitable position when loading the data to an operator 300, without reconstructing the data in a real physical memory.

The neural network operation apparatus 10 may selectively apply input tensor virtualization and output tensor virtualization based on the structure of a neural network that performs the operation.

The neural network operation device 10 may reduce the memory usage and process the data reconstruction operation quickly, since the neural network operation device 10 does not separately store data used for the operation in the physical memory through tensor virtualization, and does not require an additional operation, thereby improving the performance of the neural network operation.

The neural network operation apparatus 10 may include a processor 100 and a memory 200. The neural network operation apparatus 10 may further include an operator 300. In an example, the neural network operation apparatus 10 may further store instructions, e.g., in memory 200, which when executed by the processor 100 configure the processor 100 to implement one or more or any combination of operations herein. The processor 100 and the memory 200 may be respectively representative of one or more processors 100 and one or more memories 200.

The processor 100 may process data stored in the memory 200. The processor 100 may execute a computer-readable code (for example, software) stored in the memory 200 and instructions triggered by the processor 100.

The "processor 100" may be a data processing device implemented by hardware including a circuit having a physical structure to perform desired operations. In an example, the desired operations may include code or instructions included in a program.

In an example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 100 may perform tensor virtualization on an input or output of the neural network operation.

The processor 100 may validate the data based on a determination that an operation of the data for the neural network operation should be performed, or based on a determination that the data requires an operation. The processor 100 may validate the data based on a virtual tensor address and a stride of the neural network operation.

The data for the neural network operation may include input data, output data, or model parameters (for example, weights) of the neural network. In an example, the data for the neural network operation may include a feature map, a width of the feature map, a height of the feature map, a number of channels of the feature map, a size of a kernel of the neural network operation, and a stride of the neural network operation.

The virtual tensor address may be an address corresponding to the position of data on the tensor. The stride may refer to an interval of movement of a filter (or kernel) when the filter is applied to the input data. The processor 100 may validate the data based on a modulo operation between the virtual tensor address and the stride.

The processor 100 may obtain a real memory address to perform the neural network operation based on a result of the validating and the virtual tensor address of the data. The processor 100 may obtain the real memory address based on the virtual tensor address, the stride of the neural network operation, or a kernel size of the neural network operation. The real memory address may be an address on a physical memory indicating the position of data on which the neural network operation is to be performed.

The processor 100 may obtain the real memory address based on the virtual tensor address, the stride of the neural network operation, or the kernel size of the neural network operation. The processor 100 may obtain the real memory address based on a value of a floor function of a value obtained by dividing the virtual tensor address by the stride or the kernel size.

The processor 100 may perform the neural network operation based on the real memory address. The processor 100 may perform the neural network operation by inputting data corresponding to the real memory address to the operator 300.

The processor 100 may obtain the real memory address for storing a result of the neural network operation based on the virtual tensor address of the data. The processor 100 may obtain the real memory address based on the virtual tensor address, a channel index of the input data, a number of channels of the input data, and a parameter of the neural network operation.

The parameter of the neural network operation may be determined based on a ratio of a size of a channel included in the input data and a size of a channel included in an output of the neural network operation. The neural network operation may include a convolution operation and an activation operation.

The processor 100 may obtain the real memory address based on a value of a floor function using the channel index, the parameter, and the number of channels. The processor 100 may obtain the real memory address based on a modulo operation between the parameter and a value of a floor function using the channel index and the number of channels. The processor 100 may obtain the real memory address based on a modulo operation between the channel index and the number of channels.

The processor 100 may perform the neural network operation by inputting the input data for the neural network operation to the operator 300. The processor 100 may output an output of the operator 300 to the real memory address.

The memory 200 may store the data for the neural network operation. The memory 200 may store instructions (or programs) executable by the processor 100. For example, the instructions may include instructions to perform an operation of the processor and/or an operation of each element of the processor.

In an example, the memory 200 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (M RAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

The operator 300 may perform a neural network operation. The operator 300 may include an accelerator. The accelerator may be a computer system or special hardware designed to accelerate a neural network application.

The operator 300 may include an accelerator. The accelerator may include a graphics processing unit (GPU), a neural processing unit (NPU), a field-programmable gate array (FPGA), an application-specific integrated circuit (ASIC), or an application processor (AP). Alternatively, the accelerator may be implemented as a software computing environment, such as a virtual machine. In an example, the operator 300 may include at least one multiply-accumulate (MAC) operator.

In some examples, the operator 300 may not be included in the neural network operation apparatus 10. However, in other examples, the operator 300 may not be included external to the neural network operation apparatus 10.

Figures 2A, 2B:
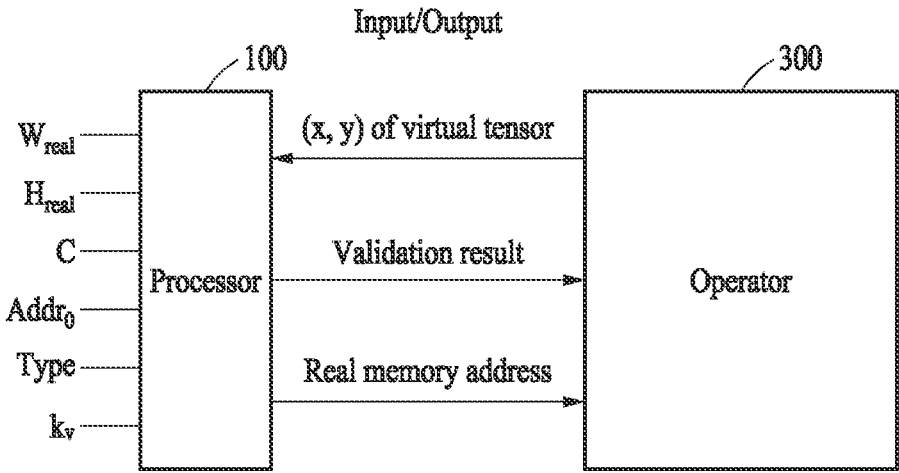
FIG. 2A illustrates an example input tensor virtualization operation, in accordance with one or more embodiments.
FIG. 2B illustrates an example of pseudocode corresponding to an example input tensor virtualization operation, in accordance with one or more embodiments.

FIG. 2A illustrates an example input tensor virtualization operation, and FIG. 2B illustrates an example of pseudocode corresponding to the input tensor virtualization operation.

Referring to FIGS. 2A and 2B, the processor 100 may perform input tensor virtualization. The processor 100 may be connected to the operator 300 in the form of a pipeline and thereby obtain sufficient time for calculating a real memory address.

The input tensor virtualization may be the process of providing the operator 300 with a position of input data used for a neural network operation by configuring a virtual tensor to provide only a position or address of data needed for the network operation.

The processor 100 may validate the data based on a determination that an operation of the data for the neural network operation should be performed. The processor 100 may validate the data based on a virtual tensor address and a stride of the neural network operation.

The processor 100 may validate the data by determining whether the data requires an operation or not. In an example, the processor 100 may determine zero data to be invalid data since the zero data does not require an operation, and determine non-zero data to be valid data since the non-zero data requires an operation. The processor 100 may perform validation and real memory address obtainment in a compiling process.

The data for the neural network operation may include input data, output data, or model parameters (for example, weights) of the neural network. The data for the neural network operation may include an on-chip tensor shape, a physical memory address (for example, $Addr_0$) of the tensor, a ratio (for example, $k_v$) associated with the neural network operation, and a type (for example, Type) of the neural network operation. The on-chip tensor shape may include a width (for example, $W_{real}$), a height (for example, $H_{real}$), and a number of channels (for example, C) of the tensor. The ratio associated with the neural network operation may include a upsampling ratio or a zero-padding ratio.

The virtual tensor address may be an address corresponding to the position of data on the tensor. The stride may refer to an interval of movement of a filter (or kernel) when the filter is applied to the input data. The processor 100 may validate the data based on a modulo operation between the virtual tensor address and the stride.

The processor 100 may validate the data using Equation 1 below. Validation may include the process of determining whether input data require an operation.

$$\text{Validate}(x,y) = (x \equiv 0(\text{mod } s) \wedge y \equiv 0(\text{mod } s)) \qquad \text{Equation 1:}$$

In Equation 1, x and y denote the coordinates of the data, and s denotes the stride. An output of the function Validate may be the result of validation. For example, the output of the function Validate may include a value of True or False. The function Validate may output True if the data are valid and output False if the data are invalid.

The processor 100 may omit validation for a neural network operation whose data are all valid. For example, in the case of an upsampling operation (for example, nearest neighbor upsampling), all input data are valid. Thus, the validation process may be omitted by assigning True to the validity of all the data.

The processor 100 may obtain a real memory address to perform the neural network operation based on a result of the validating and the virtual tensor address of the data. The processor 100 may obtain the real memory address based on the virtual tensor address, the stride of the neural network operation, or a kernel size of the neural network operation. The real memory address may be an address on a physical memory indicating the position of data on which the neural network operation is to be performed.

The processor 100 may obtain the real memory address based on the virtual tensor address, the stride of the neural network operation, or the kernel size of the neural network operation. The processor 100 may obtain the real memory address based on a value of a floor function of a value obtained by dividing the virtual tensor address by the stride or the kernel size.

The processor 100 may obtain the real memory address for performing the neural network operation using Equation 2 or Equation 3 below.

$$\text{GetInputAddr}(x, y) = \text{Input}\left[\left\lfloor \frac{x}{k} \right\rfloor\right]\left[\left\lfloor \frac{y}{k} \right\rfloor\right] \qquad \text{Equation 2}$$

$$\text{GetInputAddr}(x, y) = \text{Input}\left[\left\lfloor \frac{x}{s} \right\rfloor\right]\left[\left\lfloor \frac{y}{s} \right\rfloor\right] \qquad \text{Equation 3}$$

In Equation 1 and Equation 2, an output of the function GetInputAddr may be the real memory address. x and y denote the coordinates of the virtual tensor address, k denotes the size of the kernel, and s denotes the stride.

The processor 100 may perform the neural network operation based on the real memory address. The processor 100 may perform the neural network operation by inputting data corresponding to the real memory address to the operator 300.

FIG. 2B illustrates an example of pseudocode corresponding to the operation described above. The code in the box may represent the input tensor virtualization operation.

Figures 3A, 3B:
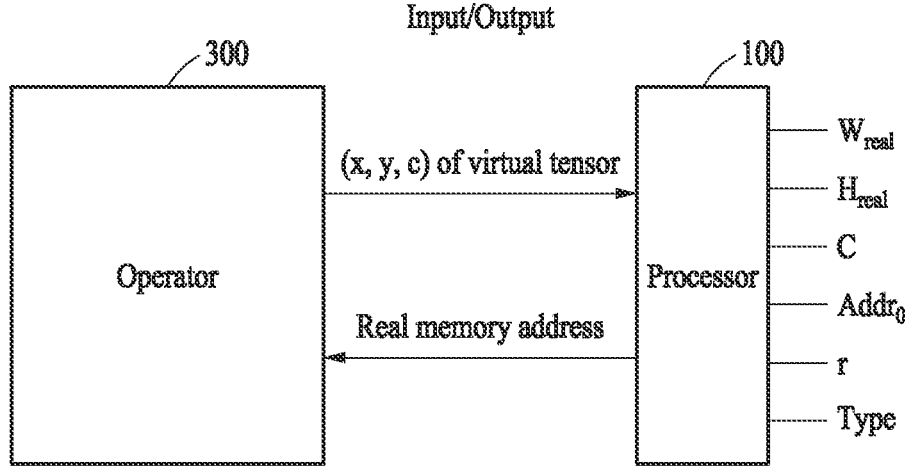
FIG. 3A illustrates an example output tensor virtualization operation, in accordance with one or more embodiments.
FIG. 3B illustrates an example of pseudocode corresponding to an example output tensor virtualization operation, in accordance with one or more embodiments.

FIG. 3A illustrates an example of an output tensor virtualization operation, and FIG. 3B illustrates an example of pseudocode corresponding to the output tensor virtualization operation.

Referring to FIGS. 3A and 3B, the processor 100 may perform output tensor virtualization. The processor 100 may be connected to the operator 300 in the form of a pipeline and thereby obtain sufficient time to calculate a real memory address.

The processor 100 may obtain the real memory address to store a result of the neural network operation based on the virtual tensor address of the data. In the output tensor virtualization operation, the neural network operation may include, as examples, a convolution operation and an activation operation.

The processor 100 may obtain the real memory address based on the virtual tensor address, a channel index of the input data, a number of channels of the input data, and a parameter of the neural network operation.

The parameter of the neural network operation may be determined based on a ratio of a size of a channel included in the input data and a size of a channel included in an output of the neural network operation. The neural network operation may include a convolution operation and an activation operation.

The processor 100 may obtain the real memory address based on a value of a floor function using the channel index, the parameter, and the number of channels. The processor 100 may obtain the real memory address based on a modulo operation between the parameter and a value of a floor function using the channel index and the number of channels. The processor 100 may obtain the real memory address based on a modulo operation between the channel index and the number of channels. The processor 100 may obtain the real memory address in a compiling process.

The data for the neural network operation may include input data, output data, or model parameters (for example, weights) of the neural network. The data for the neural network operation may include an on-chip tensor shape, a physical memory address (for example, $\text{Addr}_0$) of the tensor, a parameter (for example, r) of the neural network operation, and a type (for example, Type) of the neural network operation. The on-chip tensor shape may include a width (for example, $W_{real}$), a height (for example, $H_{real}$), and a number of channels (for example, C) of the tensor. The parameter of the neural network operation may include a subpixel convolution parameter.

The processor 100 may obtain the real memory address based on Equation 4 below.

$$\text{GetOutputAddr}(x, y, n) = \qquad \text{Equation 4}$$
$$\left\{ \&Output\left[rx + \left\lfloor \frac{n}{rC} \right\rfloor\right]\left[ry + \left(\left\lfloor \frac{n}{C} \right\rfloor \%r\right)\right][n\%C] \right\}$$

In Equation 4, an output of the function GetOutputAddr may be the real memory address. x and y denote the virtual tensor address, and n denotes the channel index of the input data. r denotes the parameter described above. In an example, r may include the subpixel convolution parameter. C denotes the number of channels of the input data.

The processor 100 may perform the neural network operation by inputting the input data for the neural network operation to the operator 300. The processor 100 may output an output of the operator 300 to the real memory address.

The processor 100 may reconstruct output data through the output tensor virtualization. The processor 100 may store the same data at multiple positions. When the same data are to be stored at multiple positions, the processor 100 may return all real memory addresses to store the output of the neural network operation. In an example, the processor 100 may store, at the address obtained with Equation 3, data output by performing both the convolution operation and the activation operation.

FIG. 3B illustrates an example of pseudocode corresponding to the operation described above. The code in the box may represent the output tensor virtualization operation.

Figure 4A:
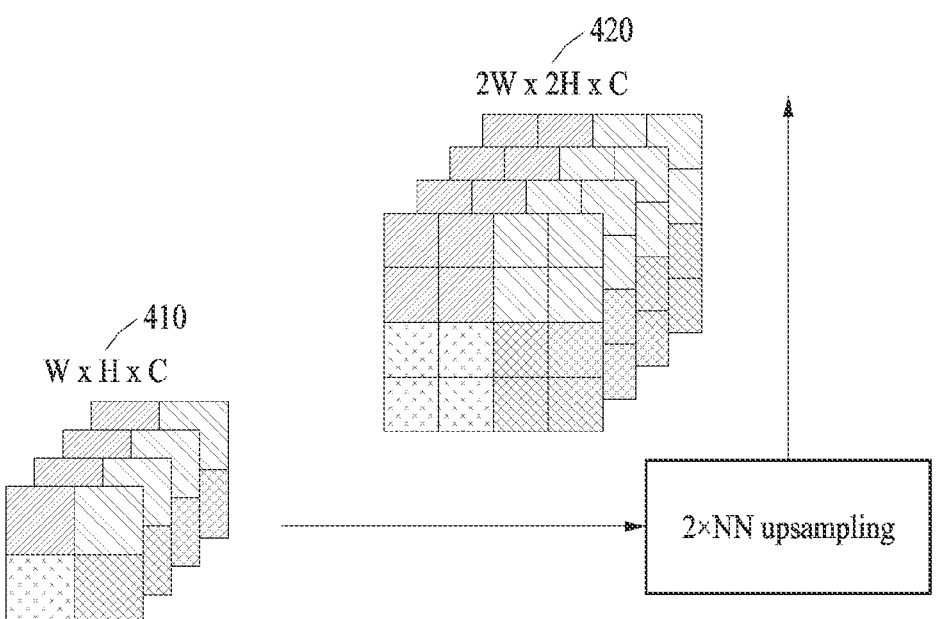
FIG. 4A illustrates an example neural network operation, in accordance with one or more embodiments.
Figure 4B:
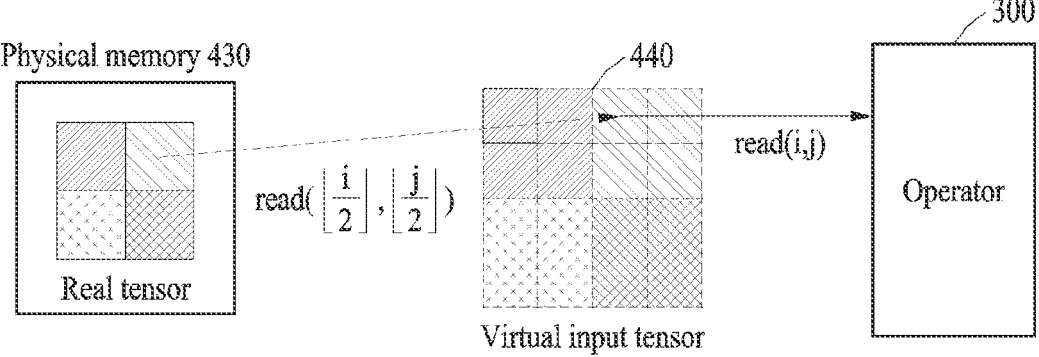
FIG. 4B illustrates an example of performing input virtualization in the operation of FIG. 4A.

FIG. 4A illustrates an example neural network operation, and FIG. 4B illustrates an example of performing input virtualization in the operation of FIG. 4A.

Referring to FIGS. 4A and 4B, the processor 100 may perform input tensor virtualization during the process of an upsampling operation (for example, nearest neighbor upsampling). The examples of FIGS. 4A and 4B illustrate an example of an operation of upsampling a width and a height of a feature map by a factor of two.

The upsampling may include the process of copying pixels included in a low-resolution image 410 and converting the pixels into a high-resolution image 420.

When input tensor virtualization is performed for the upsampling operation, the processor 100 may omit validation. In an example, when input tensor virtualization is performed for the upsampling operation, the processor 100 may omit validation by setting a validation result to always have a value of True.

In the example of the upsampling operation, a determination that an operation should be performed on all data is acknowledged. Thus, validation may be omitted.

The processor 100 may generate a virtual input tensor 440 by performing input tensor virtualization. In FIG. 4B, i and j denote a virtual tensor address or coordinates corresponding to the address. The processor 100 may obtain an address of a physical memory 430 for data used for the upsampling operation by performing input tensor virtualization using Equation 2, thereby generating the virtual input tensor 440.

The processor 100 may perform a neural network operation, (for example, upsampling operation), by providing input data to the operator 300 based on the generated virtual input tensor 440.

Figure 5A:
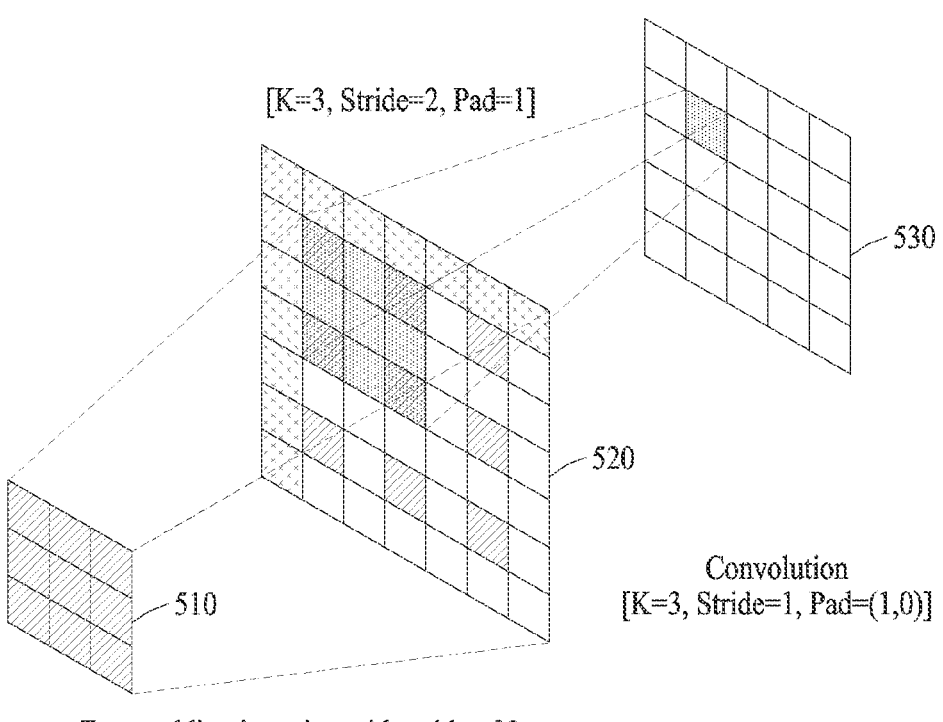
FIG. 5A illustrates an example neural network operation, in accordance with one or more embodiments.
Figure 5B:
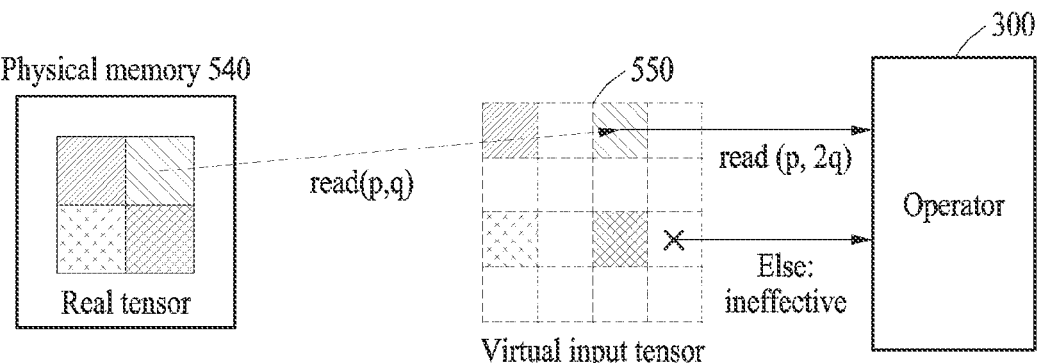
FIG. 5B illustrates an example of performing input virtualization in the operation of FIG. 5A.

FIG. 5A illustrates an example neural network operation, in accordance with one or more embodiments, and FIG. 5B illustrates an example of performing input virtualization in the operation of FIG. 5A.

Referring to FIGS. 5A and 5B, the processor 100 may perform input tensor virtualization during a transposed convolution process. Transposed convolution may be a reverse operation of a convolution operation.

Referring to FIG. 5A, the processor 100 may generate an output feature map 530 of the transposed convolution operation based on a kernel 510 and a feature map 520. The processor 100 may generate the feature map 520 by performing zero padding insertion. The example of FIG. 5A illustrates an example of zero padding insertion with a stride of "2".

The processor 100 may generate the output feature map 530 by performing a convolution operation while moving the kernel 510 by an interval of the stride based on the kernel 510 and the feature map 520. The example of FIG. 5A illustrates a convolution operation in which the size of a kernel is "3", a stride is "1", and a pad is (1, 0).

The processor 100 may obtain an address of the physical memory 540 for validated input data.

The processor 100 may generate a virtual input tensor 550 by performing input tensor virtualization. Referring to FIG. 5B, p and q denote the address or coordinates of the physical memory 540 for the input data. The processor 100 may obtain the address of the physical memory 540 for data used for the upsampling operation by performing input tensor virtualization using Equation 3, thereby generating the virtual input tensor 550.

The processor 100 may perform a neural network operation, (for example, transposed convolution operation), by providing input data to the operator 300 based on the generated virtual input tensor 550.

Figure 6A:
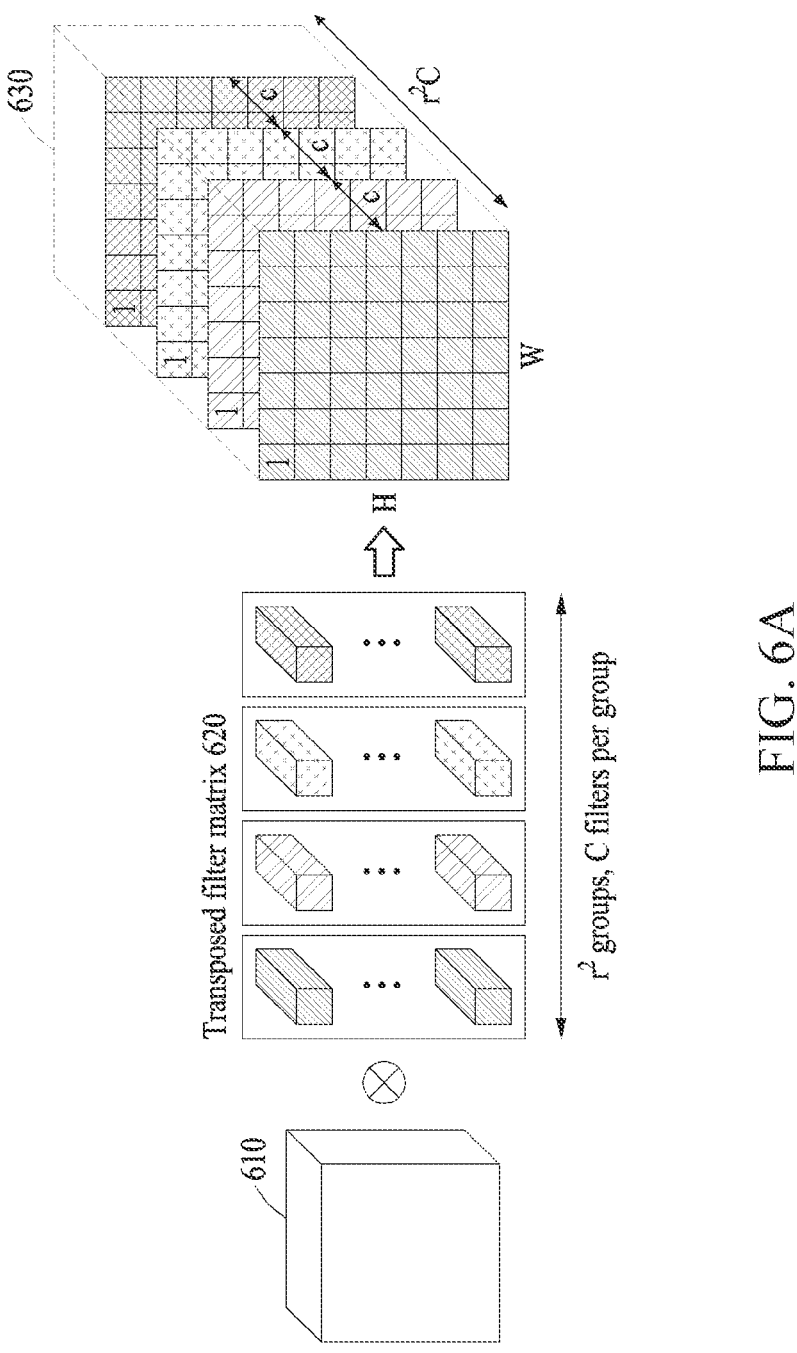
FIGS. 6A and 6B illustrate examples of neural network operations, in accordance with one or more embodiments.
Figure 6B:
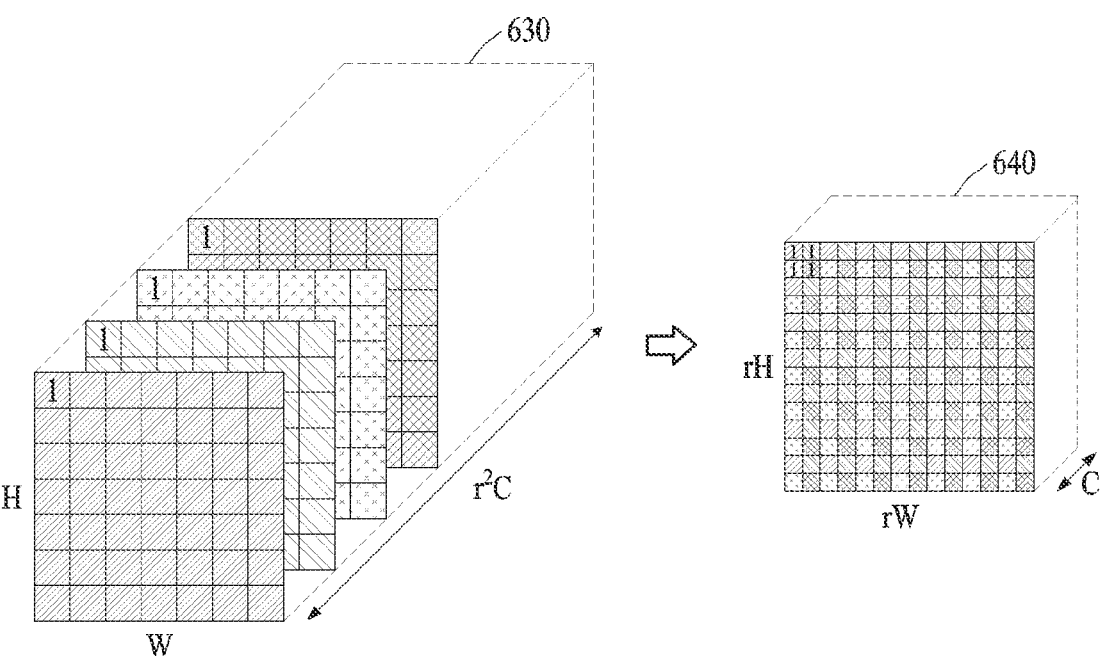
Figure 6C:
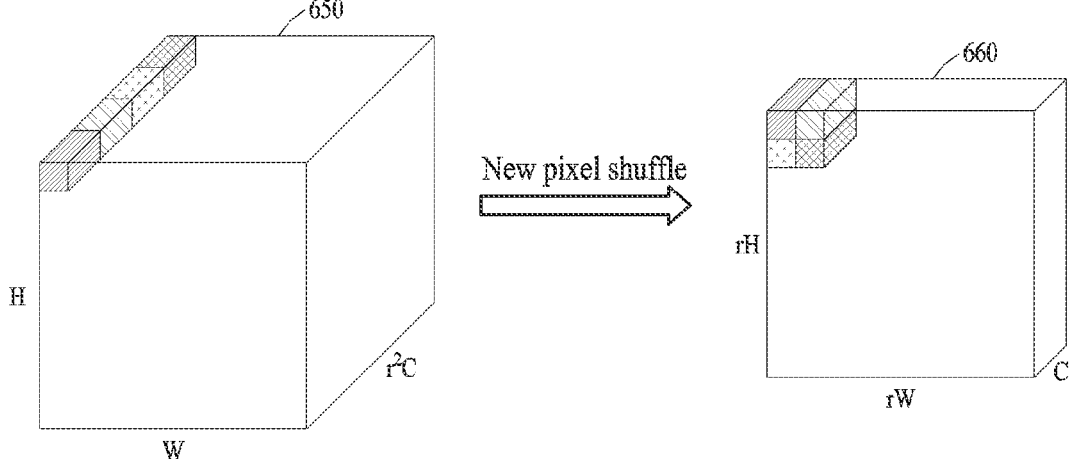
FIGS. 6C and 6D illustrate examples of performing output virtualization in the operations of FIGS. 6A and 6B.
Figure 6D:
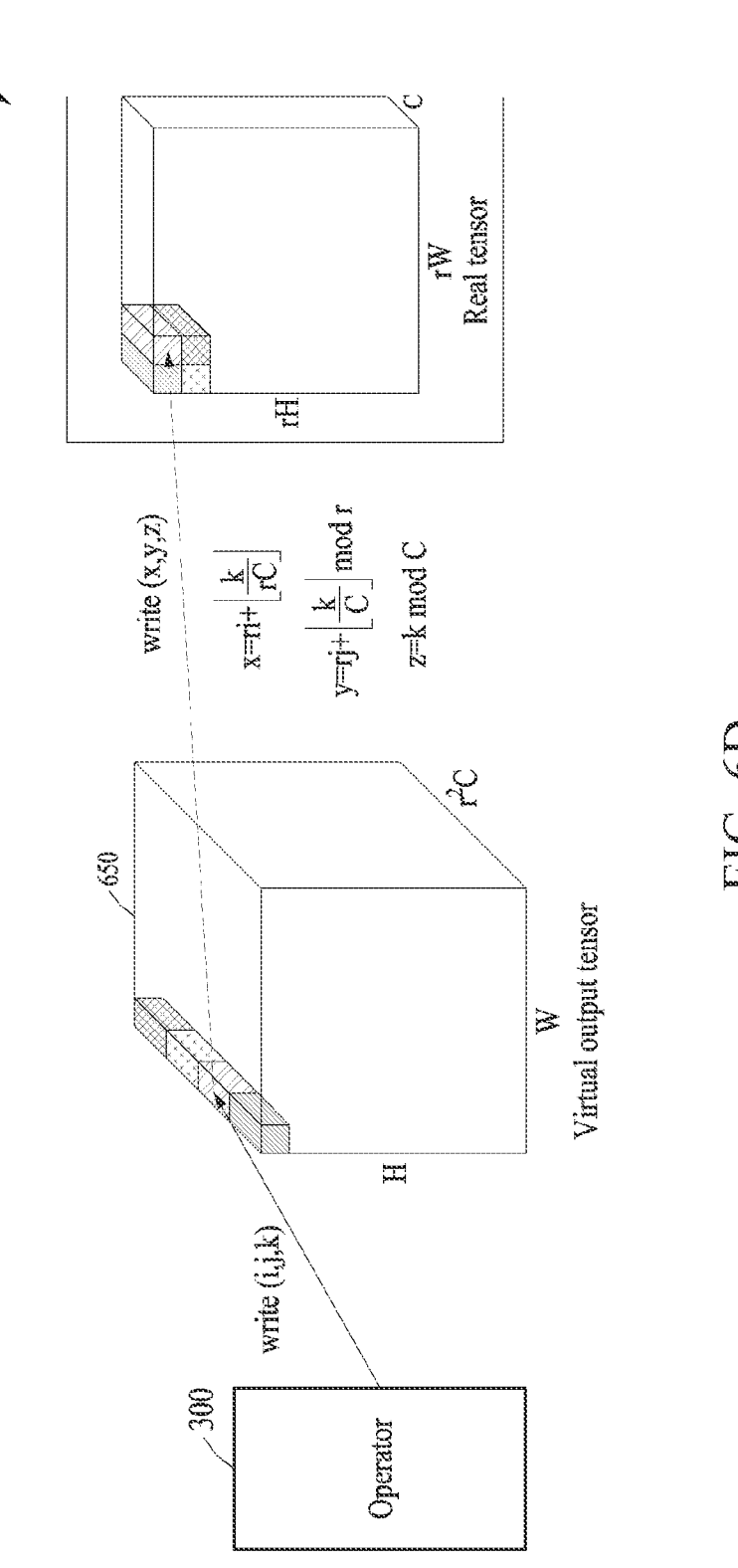

FIGS. 6A and 6B illustrate examples of neural network operations, and FIGS. 6C and 6D illustrate examples of performing output virtualization in the operations of FIGS. 6A and 6B.

Referring to FIGS. 6A and 6B, the processor 100 may perform output tensor virtualization. The processor 100 may perform output tensor virtualization during a subpixel convolution process.

The processor 100 may obtain channels 630 by performing a convolutional operation on a feature map 610 using a transposed filter matrix 620. The transposed filter matrix 620 may have $r^2$ groups and include C filters per group. The processor 100 may obtain an output feature map 640 by performing pixel shuffling with respect to the channels 630.

A parameter r, (for example, subpixel convolution parameter), of the neural network operation may be determined based on a ratio of a size of a channel included in the input data and a size of a channel included in an output of the neural network operation. For example, r may be a ratio between a width rW of the output feature map 640 and a width W of an input feature map included in the channels 630.

The neural network operation may include a convolution operation and an activation operation. The processor 100 may perform output tensor virtualization, thereby directly generating the output feature map 640 without rearranging the data on which the convolution operation and the activation operation are performed and performing a separate pixel shuffling process.

The processor 100 may perform new pixel shuffling on a virtual output tensor 650 with a height H, a width W, and a depth (or a number of channels) $r^2C$ using output tensor virtualization, thereby generating a real tensor 660 with a height rH, a width rW, and a depth C.

In this example, the processor 100 may generate the virtual output tensor 650 based on an operation result received from the operator 300. The processor 100 may generate a virtual output tensor with Equation 4.

Specifically, the processor 100 may obtain a value of x of a real memory (for example, real tensor 660) address based on a value of a floor function using a channel index, a parameter, and a number of channels. The processor 100 may obtain the value of x in the real memory address using Equation 5 below.

$$x = ri + \left\lfloor \frac{k}{rC} \right\rfloor \qquad \text{Equation 5}$$

In Equation 5, r denotes a subpixel convolution parameter, and i denotes an address of the x-coordinate of the virtual output tensor 650. k denotes the channel index, and C denotes the number of channels.

The processor 100 may obtain a value of y of the real memory (for example, real tensor 660) address based on a modulo operation between the parameter and a value of a floor function using the channel index and the number of channels. The processor 100 may obtain the value of y in the real memory address using Equation 6 below.

$$y = rj + \left\lfloor \frac{k}{C} \right\rfloor \bmod r \qquad \text{Equation 6}$$

In Equation 6, j denotes the y-coordinate of the virtual output tensor 650.

The processor 100 may obtain a z address of the real memory (for example, real tensor 660) address based on a modulo operation between the channel index and the number of channels. The processor 100 may obtain the value of z of the real memory address using Equation 7 below.

$$z = k \bmod C \qquad \text{Equation 7:}$$

Figure 7:
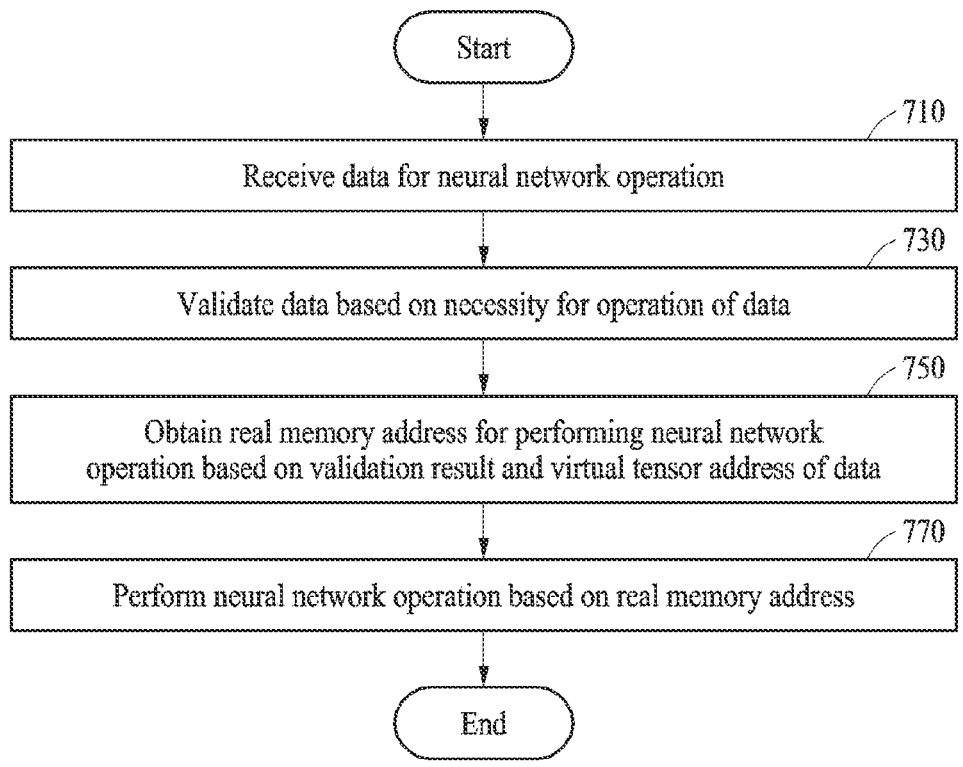
FIGS. 7 and 8 illustrate examples of flows of the operations of the neural network operation apparatus of FIGS. 1A and 1B.

FIG. 7 illustrates an example of a flow of the operation of the neural network operation apparatus of FIGS. 1A and 1B. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6D are also applicable to FIG. 7, and are incorporated herein by reference. Thus, the above description may not be repeated here.

Referring to FIG. 7, in operation 710, a processor (for example, the processor 100 of FIG. 1A) may receive data for a neural network operation. The neural network operation may include, as non-limiting examples, an upsampling operation or a transposed convolution operation. The data may include a feature map, a width of the feature map, a height of the feature map, a number of channels of the feature map, a size of a kernel of the neural network operation, and a stride of the neural network operation.

In operation 730, the processor 100 may validate the data based on a determination that an operation should be performed on the data. The processor 100 may validate the data based on a virtual tensor address and the stride of the neural network operation. The processor 100 may validate the data based on a modulo operation between the virtual tensor address and the stride.

In operation 750, the processor 100 may obtain a real memory address to perform the neural network operation based on a result of the validating and the virtual tensor address of the data. The processor 100 may obtain the real memory address based on the virtual tensor address, the stride of the neural network operation, or a kernel size of the neural network operation. The processor 100 may obtain the real memory address based on a value of a floor function of a value obtained by dividing the virtual tensor address by the stride or the kernel size.

In operation 770, the processor 100 may perform the neural network operation based on the real memory address. The processor 100 may perform the neural network operation by inputting data corresponding to the real memory address to an operator (for example, the operator 300 of FIG. 1B). The operator may include at least one MAC operator.

Figure 8:
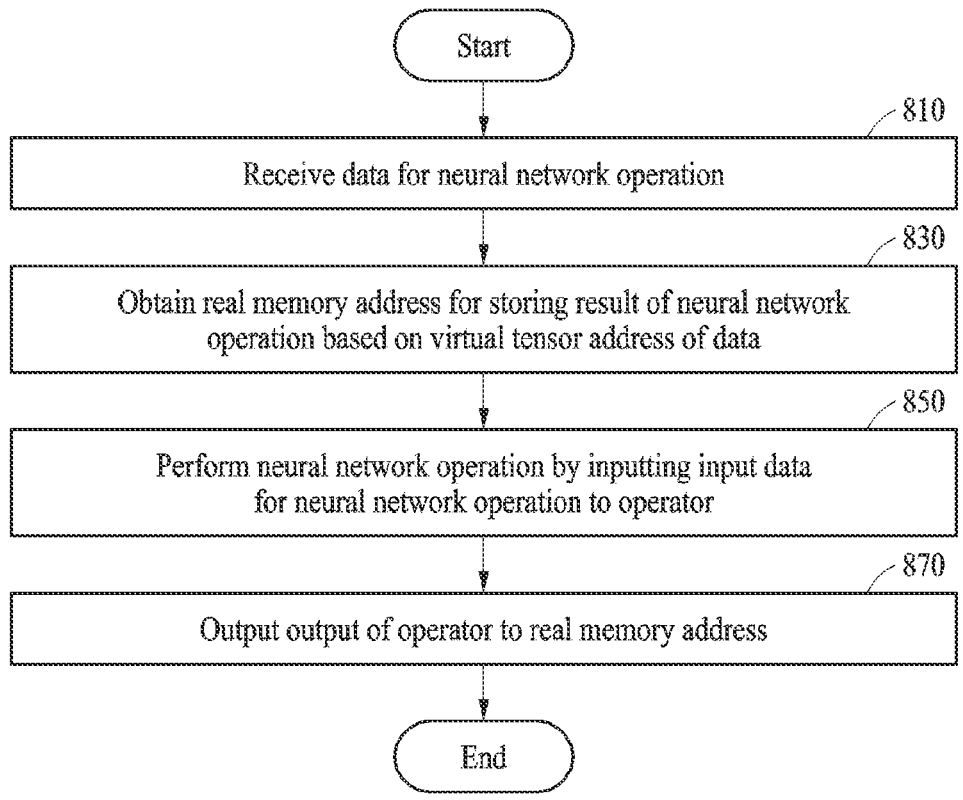

FIG. 8 illustrates an example of a flow of the operation of the neural network operation apparatus of FIGS. 1A and 1B. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, a processor (for example, the processor 100 of FIG. 1A) may receive data for a neural network operation. The neural network operation may include, as non-limited examples, a convolution operation and an activation operation.

In operation 830, the processor 100 may obtain a real memory address to store a result of the neural network operation based on a virtual tensor address of the data. The processor 100 may obtain the real memory address based on the virtual tensor address, a channel index of the input data, a number of channels of the input data, and a parameter of the neural network operation.

The processor 100 may obtain the real memory address based on a value of a floor function using the channel index, the parameter, and the number of channels. The processor 100 may obtain the real memory address based on a modulo operation between the parameter and a value of a floor function using the channel index and the number of channels. The processor 100 may obtain the real memory address based on a modulo operation between the channel index and the number of channels.

The parameter may be determined based on a ratio of a size of a channel included in the input data and a size of a channel included in an output of the neural network operation.

In operation 850, the processor 100 may perform the neural network operation by inputting the input data for the neural network operation to an operator (for example, the operator 300 of FIG. 1B).

In operation 870, the processor 100 may output an output of the operator 300 to the real memory address.

A neural network apparatus of one or more embodiments may be configured to reduce the amount of calculations to process a neural network, thereby solving such a technological problem and providing a technological improvement by advantageously increasing a calculation speed of the neural network apparatus of one or more embodiments over the typical neural network apparatus.

The neural network operation apparatuses 10, processor 100, memory 200, operator 300, and other apparatuses, units, modules, devices, and other components described herein and with respect to FIGS. 1-8, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods that perform the operations described in this application and illustrated in FIGS. 1-8 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network operation apparatus, comprising:
a memory, configured to store data for a neural network operation; and
one or more processors, configured to:
validate the data based on a determination that the neural network operation should be performed on the data and based on a modulo operation between a virtual tensor address of the data and a stride of the neural network operation, the virtual tensor address of the data corresponding to a position of the data on a virtual tensor;

when a result of the validating is valid, obtain a real memory address to perform the neural network operation based on a value an output of a floor function of a value obtained by dividing the virtual tensor address of the data by the stride of the neural network operation; provide input data corresponding to the real memory address to an operator to perform the neural network operation;

transmit an output of the operator to a corresponding real memory address; and perform inference operation associated with a neural network application by accelerating the neural network application based on the output of the operator transmitted to the corresponding real memory address.

2. The apparatus of claim 1, wherein the neural network operation comprises one of an upsampling operation and a transposed convolution operation.

3. The apparatus of claim 1, wherein the data comprises at least one of a feature map, a width of the feature map, a height of the feature map, a number of channels of the feature map, a size of a kernel of the neural network operation, and the stride of the neural network operation.

4. The apparatus of claim 1, further comprising:
the operator, configured to perform the neural network operation.

5. The apparatus of claim 4, wherein the operator comprises at least one multiply accumulator (MAC) operator.

6. A neural network operation apparatus, comprising:
a memory, configured to store data for a neural network operation; and
one or more processors configured to:
obtain a real memory address, depending on a validity of the data, to store a result of the neural network operation based on an output of a floor function using a virtual tensor address of the data, a channel index of input data, a parameter of the neural network operation, and a number of channels of the input data, wherein the data is verified for the validity of the data based on verification that neural network operations should be performed on the data and based on a modulo operation between the virtual tensor address of the data and a stride of the neural network operation, the virtual tensor address of the data corresponding to a position of the data on a virtual tensor,
provide the input data to an operator to perform the neural network operation,
transmit an output of the operator to the real memory address, and perform inference operation associated with a neural network application by accelerating the neural network application based on the output of the operator transmitted to the corresponding real memory address.

7. The apparatus of claim 6, wherein the parameter of the neural network operation is determined based on a ratio of a size of a channel included in the input data, and a size of a channel included in an output of the neural network operation.

8. The apparatus of claim 6, wherein the neural network operation comprises a convolution operation and an activation operation.

9. The apparatus of claim 6, wherein the one or more processors are further configured to obtain the real memory address based on a modulo operation between the parameter and the value of the floor function using the channel index and the number of channels.

10. The apparatus of claim 6, wherein the one or more processors are further configured to obtain the real memory address based on a modulo operation between the channel index and the number of channels.

11. A neural network operation method, comprising:
receiving data for a neural network operation;
validating the data based on a determination that the neural network operation should be performed on the data and based on a modulo operation between a virtual tensor address of the data and a stride of the neural network operation, the virtual tensor address of the data corresponding to a position of the data on a virtual tensor;
when a result of the validating is valid, obtaining a real memory address to perform the neural network operation based on an output of a floor function of a value obtained by dividing the virtual tensor address of the data by the stride of the neural network operation;
providing input data corresponding to the real memory address to an operator to perform the neural network operation based on the real memory address;
transmit an output of the operator to a corresponding real memory address; and
perform inference operation associated with a neural network application by accelerating the neural network application based on the output of the operator transmitted to the corresponding real memory address.

12. The neural network operation method of claim 11, wherein the neural network operation comprises one of an upsampling operation and a transposed convolution operation.

* * * * *